(12) United States Patent
Sekido (10) Patent No.: US 8,064,456 B2
(45) Date of Patent: Nov. 22, 2011

(54) FRAME RELAY APPARATUS AND ROUTE LEARNING METHOD

(75) Inventor: Mami Sekido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 12/364,564

(22) Filed: Feb. 3, 2009

(65) Prior Publication Data

US 2009/0207842 A1   Aug. 20, 2009

(30) Foreign Application Priority Data

Feb. 15, 2008   (JP) .................................. 2008-034501

(51) Int. Cl.
H04L 12/56   (2006.01)
(52) U.S. Cl. .......................... 370/392; 370/401; 709/238
(58) Field of Classification Search .......................... None
See application file for complete search history.

(56) References Cited

U.S. PATENT DOCUMENTS

| | | | | |
|---|---|---|---|---|
| 5,309,437 A * | 5/1994 | Perlman et al. | ............... | 370/401 |
| 6,262,988 B1 * | 7/2001 | Vig | ............... | 370/401 |
| 6,697,338 B1 * | 2/2004 | Breitbart et al. | ............... | 370/254 |
| 6,754,211 B1 * | 6/2004 | Brown | ............... | 370/389 |
| 2002/0161918 A1 * | 10/2002 | Asano et al. | ............... | 709/238 |
| 2004/0213270 A1 * | 10/2004 | Su et al. | ............... | 370/401 |
| 2004/0228289 A1 * | 11/2004 | Sano | ............... | 370/253 |
| 2007/0127376 A1 * | 6/2007 | Chao et al. | ............... | 370/230 |
| 2008/0123662 A1 * | 5/2008 | Basso et al. | ............... | 370/395.31 |
| 2010/0111083 A1 * | 5/2010 | Bhaskaran | ............... | 370/389 |

FOREIGN PATENT DOCUMENTS

JP   2005-020170   1/2005

* cited by examiner

*Primary Examiner* — Robert Scheibel
(74) *Attorney, Agent, or Firm* — Staas & Halsey LLP (57) ABSTRACT

A frame relay apparatus includes an acquisition unit for acquiring a frame from an input port connected to a first subnet, a setting unit for setting an output port corresponding to a destination of the frame acquired by the acquisition unit, an assignment unit for assigning, to the frame, a flag indicating whether the output port of the frame set by the setting unit is connected to a second subnet, and a registration unit for storing the flag assigned to the frame by the assigning unit as well as a source address of the frame acquired by the acquisition unit and a port number in a learning table for storing a correspondence between an address and the port number.

7 Claims, 6 Drawing Sheets

| DOMAIN ID | PORT |
|---|---|
| sub 1 | 1-7 |
| sub 2 | 8-14 |

FIG. 4

| DESTINATION ADDRESS | SOURCE ADDRESS | DOMAIN ID | OUTPUT PORT | FLAG |
|---|---|---|---|---|
| 00-D0-59-xx | 00-08-02-pp | sub 1 | 1 | 0 |
| 00-D0-59-yy | 00-FE-00-qq | sub 1 | 5 | 0 |
| 00-D0-59-zz | 00-97-D7-rr | sub 1 | 8 | 1 |
| ... | | | | |

FRAME RELAY APPARATUS AND ROUTE LEARNING METHOD

CROSS-REFERENCE TO RELATED APPLICATIONS

This application is based upon and claims the benefit of priority of the prior Japanese Patent Application No. 2008-034501, filed on Feb. 15, 2008, the entire contents of which are incorporated herein by reference.

FIELD

The embodiment discussed herein relates to a frame relay apparatus and a route learning method.

BACKGROUND

Multiple communication terminals provided in a company or the like have typically formed a local area network (LAN) in recent years. In some cases, communication terminals forming a LAN are logically grouped regardless of how the terminals are physically connected to one another, so that multiple VLANs are formed in the LAN. If VLANs are formed, communication terminals belonging to an identical VLAN communicate with one another as if the communication terminals belonged to a LAN. Also, the communication terminals are distinguished from communication terminals belonging to a different VLAN regardless of how the former terminals and the latter terminals are physically connected to each other.

As for an configuration of a VLAN, for example, Japanese Laid-open Patent Publication No. 2005-20170 discloses a technology for efficiently routing a frame within a VLAN as well as between VLANs by providing an address conversion apparatus for converting a private IP address for independent use within a VLAN into a global IP address for common use outside the VLAN and vice versa. Specifically, in this related-art example, a single address conversion apparatus performs address conversion for each of multiple VLANs while changing an address conversion table for each VLAN.

Figure 6:
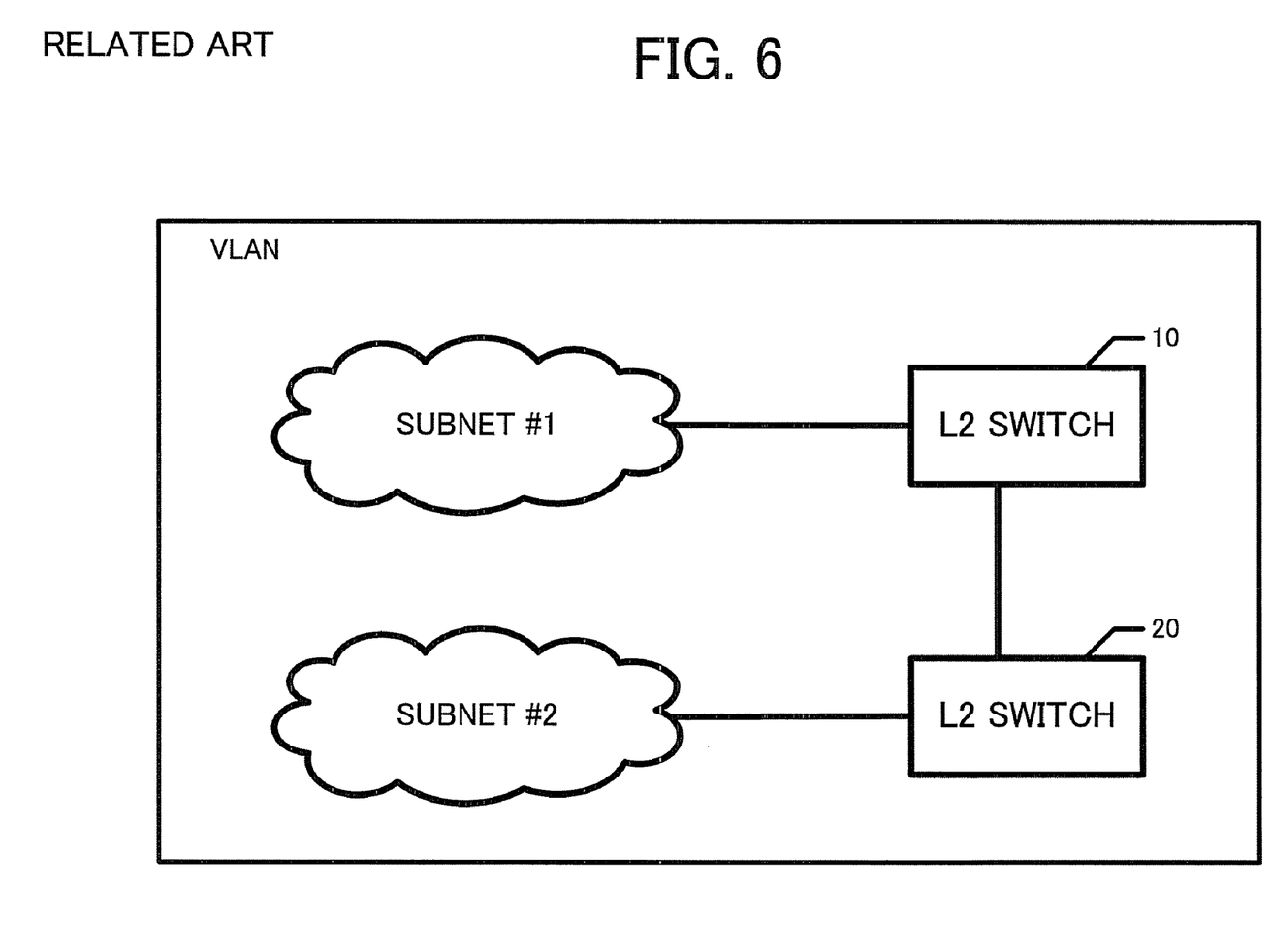
FIG. 6 is a diagram showing an example configuration of a VLAN.

Incidentally, communication terminals in a VLAN may be further grouped so as to form multiple subnets. Sometimes, these subnets are connected to one another via an L2 switch (Layer 2 switch). For example, as shown in FIG. 6, assume that a VLAN is divided into a subnet #1 and a subnet #2 and that an L2 switch 10 is provided for the subnet #1 and an L2 switch 20 is provided for the subnet #2. In this case, the subnets #1 and #2 are connected to each other by connecting the L2 switches 10 and 20.

If a communication terminal belonging to the subnet #1 transmits a frame to a communication terminal belonging to the subnet #2 in the VLAN configuration shown in FIG. 6, this frame is relayed by the L2 switches 10 and 20. That is, a frame to be transmitted between the subnets is always transmitted via a path between the L2 switches 10 and 20. Therefore, if different fee systems are applied to intra-subnet communications and inter-subnet communications, it is useful for the system to configure the VLAN having a plurality of subnets. Because whether the transmission of a frame is an intra-subnet transmission or an inter-subnet transmission is determined on the basis of whether the frame has been transmitted via the path between the L2 switches 10 and 20.

However, a problem here is that if an L2 switch is provided for each of multiple subnets, a port of each L2 switch is used to connect the L2 switches provided for the subnets to one another so that the number of available ports of each L2 switch is reduced.

Specifically, since the L2 switches 10 and 20 are connected to each other in the VLAN configuration shown in FIG. 6, one of the L2 switches must allocate one of ports thereof for connection to the other L2 switch. As a result, the number of ports of the L2 switch available for connection to communication terminals in the subnet is reduced by one. If the number of ports available for connection to communication terminals in one subnet must be increased, more L2 switches must be provided for the subnet. As a result, the cost required to form a VLAN is increased.

Also, an L2 switch is provided for each subnet in the VLAN configuration shown in FIG. 6; therefore, as the number of subnets is increased, the number of required L2 switches is also increased. Thus, the cost required to form a VLAN is further increased.

On the other hand, if a VLAN has a configuration in which multiple subnets are connected to one another via a single L2 switch, port-to-port connection between L2 switches becomes unnecessary and an increase in cost due to an increase in the number of L2 switches is prevented. However, if this configuration is adopted, whether the transmission of a frame is an intra-subnet transmission or an inter-subnet transmission is not determined on the basis of whether the frame has been transmitted via a particular path. That is, in the VLAN configuration shown in FIG. 6, the type of the transmission of a frame is determined on the basis of whether the frame has been transmitted via the path between the L2 switches 10 and 20; on the other hand, in the configuration in which a single L2 switch is provided between two subnets, the type of the transmission of a frame cannot be determined, since the frame is relayed by the L2 switch in both a case where the frame is transmitted within a subnet and a case where the frame is transmitted between subnets.

SUMMARY

According to an aspect of an embodiment, a frame relay apparatus includes an acquisition unit for acquiring a frame from an input port connected to a first subnet, a setting unit for setting an output port corresponding to a destination of the frame acquired by the acquisition unit, an assignment unit for assigning, to the frame, a flag indicating whether the output port of the frame set by the setting unit is connected to a second subnet, and a registration unit for storing the flag assigned to the frame by the assigning unit as well as a source address of the frame acquired by the acquisition unit and a port number in a learning table for storing a correspondence between an address and the port number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following description, an L2 switch will be used as an example of such a frame relay apparatus.

Figure 1:
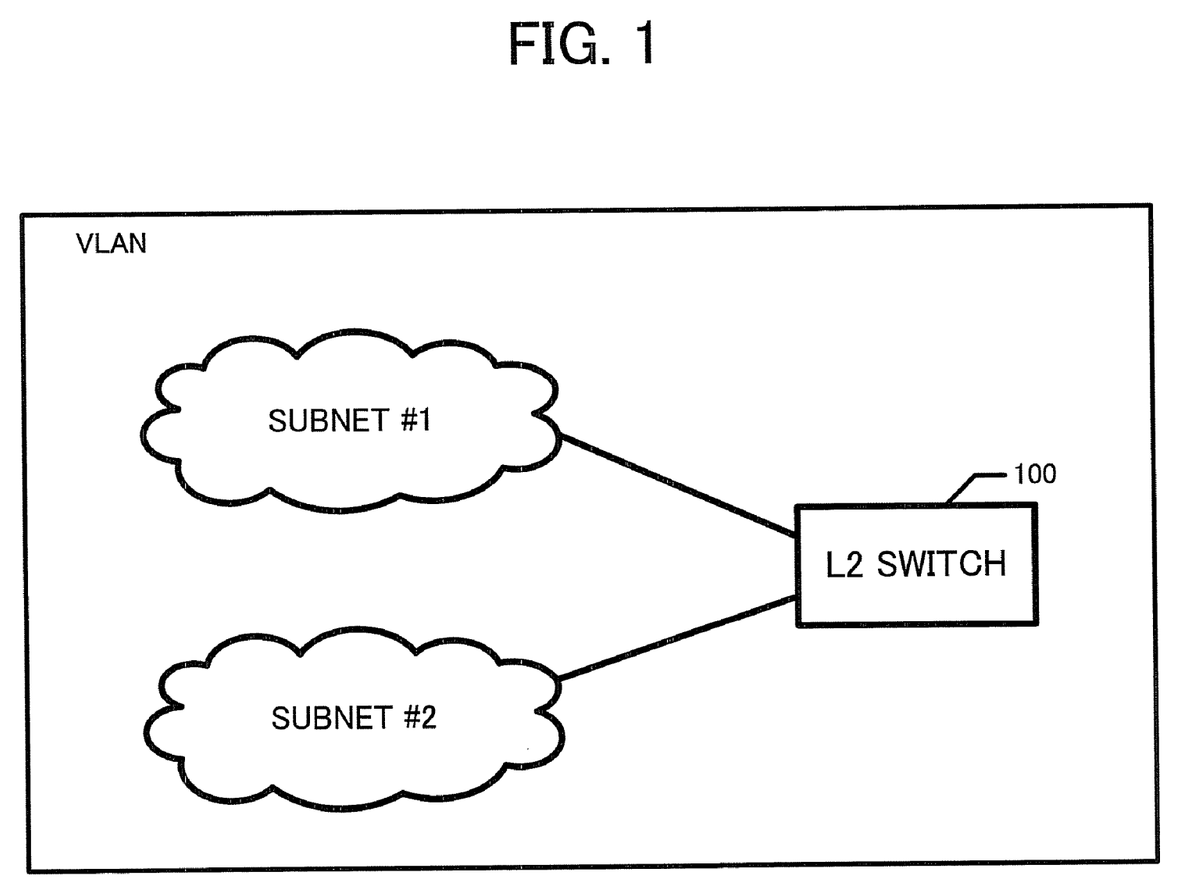
FIG. 1 is a diagram showing an example configuration of a VLAN according to the embodiment.

FIG. 1 is a diagram showing an example configuration of a VLAN according to this embodiment. As shown in FIG. 1, the VLAN according to this embodiment is divided into a subnet #1 and a subnet #2, which are connected to each other via only an L2 switch 100. Therefore, a frame transmitted by a communication terminal belonging to the subnet #1 is always transferred via the L2 switch 100 regardless of whether the destination address of the frame is an address in the subnet #1 or an address in the subnet #2. As such, a frame transmitted by a communication terminal belonging to the subnet #2 is always transferred via the L2 switch 100.

Figure 2:
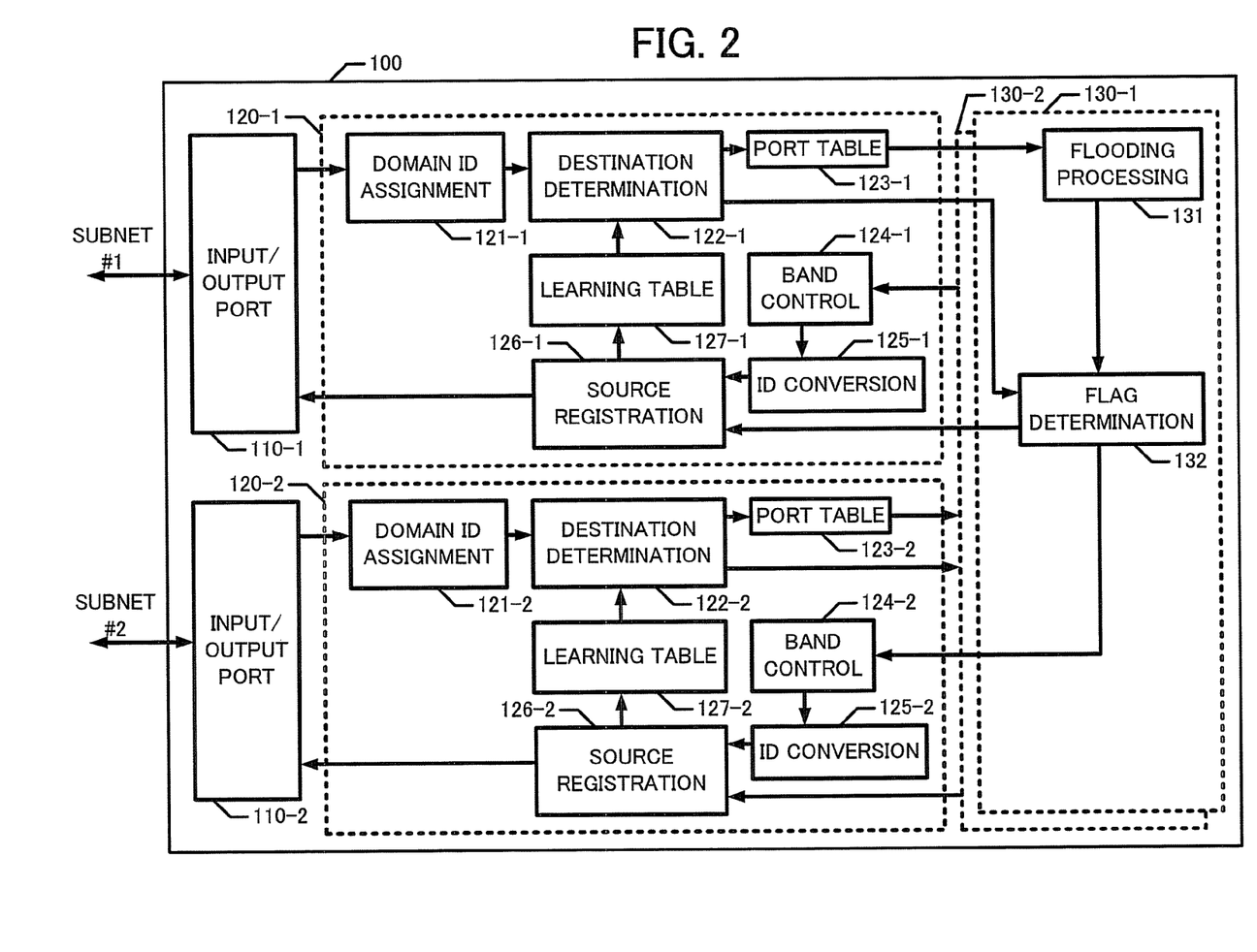
FIG. 2 is a block diagram showing a configuration of a main part of an L2 switch according to the embodiment.

FIG. 2 is a block diagram showing a configuration of a main part of the L2 switch 100 according to this embodiment. The L2 switch 100 mainly includes an input/output port unit 110-1, a domain processing unit 120-1, and a transfer unit 130-1 each corresponding to the subnet #1 and an input/output port unit 110-2, a domain processing unit 120-2, and a transfer unit 130-2 each corresponding to the subnet #2. The input/output port unit 110-2, domain processing unit 120-2, and transfer unit 130-2 are similar to the input/output port unit 110-1, domain processing unit 120-1, and transfer unit 130-1 except that the former components correspond to the subnet #2; therefore, only the input/output port unit 110-1, domain processing unit 120-1, and transfer unit 130-1 each corresponding to the subnet #1 will be described.

The input/output port unit 110-1 includes, for example, multiple ports and is connected to communication terminals belonging to the subnet #1 via these ports. The input/output port unit 110-1 receives a frame transmitted by a communication terminal belonging to the subnet #1 into the L2 switch 100 via one of these ports or transmits a frame relayed by the L2 switch 100 to a communication terminal belonging to the subnet #1 via one of these ports. The communication terminals belonging to the subnet #1 are assigned unique medium access control (MAC) addresses. The ports of the input/output port unit 110-1 correspond to the MAC addresses of the communication terminals to which the ports are connected. A frame inputted or outputted to or from each port includes the MAC address of a communication terminal as the source of the frame (hereafter simply referred to as a "source address") and the MAC address of a communication terminal as the destination thereof (hereafter simply referred to as a "destination address").

The domain processing unit 120-1 performs an input process on a frame inputted from the subnet #1 or performs an output process on a frame to be outputted to the subnet #1. The domain processing unit 120-1 includes a domain ID assignment unit 121-1, a destination determination unit 122-1, a port table 123-1, a band control unit 124-1, an ID conversion unit 125-1, a source registration unit 126-1, and a learning table 127-1.

The domain ID assignment unit 121-1 assigns a unique domain ID corresponding to the subnet #1, to a frame inputted via the input/output port unit 110-1. That is, the domain ID assignment unit 121-1 assigns a domain ID unique to a subnet to which the source terminal of the frame belongs, to the frame. The domain ID is used in the L2 switch 100 in order to identify the subnet to which the source terminal of the frame belongs.

The destination determination unit 122-1 searches the learning table 127-1 for an output port corresponding to the ID domain assigned to the frame and the destination address included in the frame. If such a port has already been learned by the learning table 127-1, namely the port number has already been stored in the learning table 127-1, the destination determination unit 122-1 assigns, to the frame, a flag stored in the learning table 127-1 in such a manner that the flag is associated with the output port. Then, the destination determination unit 122-1 makes a setting such that the frame is transmitted from the retrieved output port and then outputs the frame to the transfer unit 130-1. In contrast, if the output port corresponding to the domain ID and destination address has not been learned yet by the learning table 127-1, namely the port number has not been yet stored in the learning table 127-1, the destination determination unit 122-1 outputs the frame to the port table 123-1.

Figure 3:
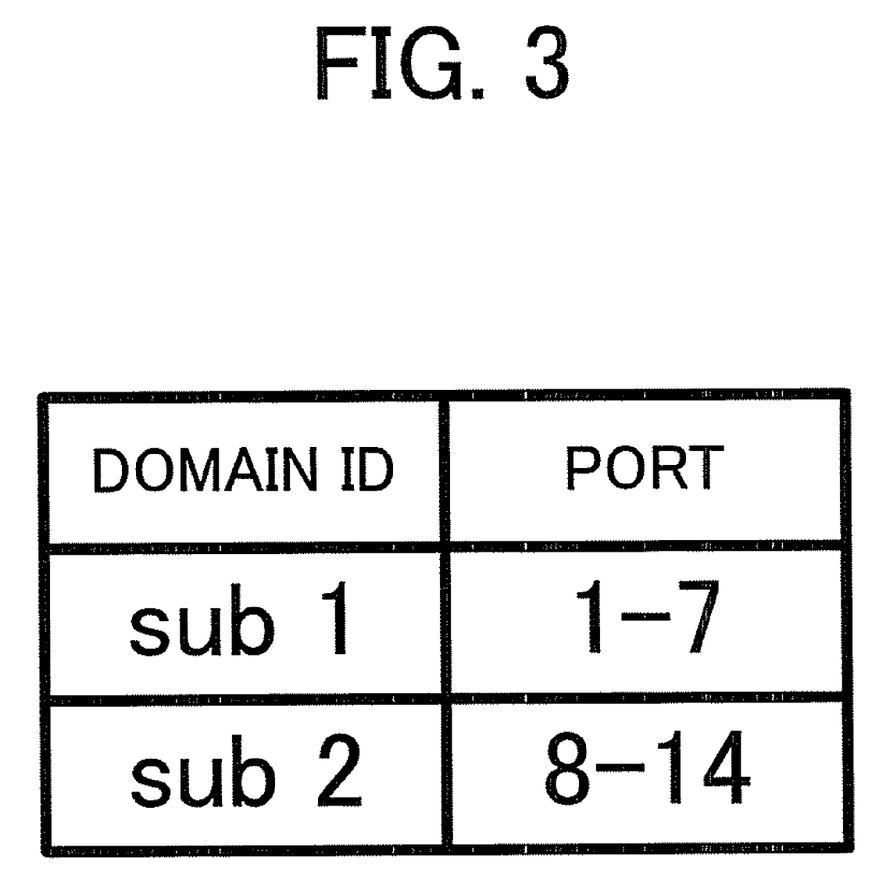
FIG. 3 is a diagram showing an example of a port table according to the embodiment.

The port table 123-1 stores the correspondences between the subnets and the ports of the input/output port units 110-1 and 110-2. That is, as shown in FIG. 3, the port table 123-1 stores the unique domain IDs and port numbers in such a manner that these domain IDs and port numbers correspond to each other. In an example shown in FIG. 3, ports 1 to 7 correspond to a domain ID "sub 1" corresponding to the subnet #1 and ports 8 to 14 correspond to a domain ID "sub 2" corresponding to the subnet #2. This means that the input/output port unit 110-1 includes the ports 1 to 7 and the input/output port unit 110-2 includes the ports 8 to 14.

When the port table 123-1 receives a frame, whose output port has not been learned yet, from the destination determination unit 122-1, the port table 123-1 outputs the frame to the transfer unit 130-1, as well as regards all ports other than the input port of the frame as flooding ports, from which the frame is transmitted at the time of flooding, and then notifies the transfer unit transfer unit 130-1 of the numbers of the flooding ports. At that time, the port table 123-1 notifies the domain IDs corresponding to the flooding ports together with the numbers of the flooding ports.

The band control unit 124-1 performs band control on a frame outputted by the transfer unit 130-2 corresponding to the subnet #2 so as to convert the frame into a frame corresponding to the subnet #1. That is, since the subnets #1 and #2 generally require frames to have different levels of quality of service (QOS), the band control unit 124-1 performs band control on a frame to be transmitted from the subnet #2 to the subnet #1 so that the frame have quality of service with a level corresponding to the subnet #1.

The ID conversion unit 125-1 converts a domain ID assigned to the frame band-controlled by the band control unit 124-1 into the domain ID unique to the subnet #1. Then, the ID conversion unit 125-1 outputs the domain ID-converted frame to the source registration unit 126-1.

Upon receipt of the frame transmitted from the subnet #2 via the ID conversion unit 125-1 or the frame transmitted from the subnet #1 via the transfer unit 130-1, the source registration unit 126-1 acquires the source address of the frame and causes the learning table 127-1 to learn the correspondence between a new destination address and a new output port. That is, the source registration unit 126-1 acquires the source address of the frame and detects the input port of the frame, and then stores the source address and input port number as a destination address and an output port number in the learning table 127-1.

The reason why the source registration unit 126-1 stores the source address of the received frame and the input port number as a destination address and an output port number in the learning table 127-1 is that a communication terminal represented by the source address of the frame is connected to the input port of the frame and if another frame is transmitted from this input port, the other frame reaches the communication terminal. Also, the source registration unit 126-1 stores the received flag and domain ID assigned to the frame in the learning table 127-1 in such a manner that the flag and domain ID are associated with the destination address and output port. The stored flag here refers to a flag indicating whether the frame will be transferred between the subnets. This flag will be described later.

The correspondence between the destination address of a frame and an output port is stored in the learning table 127-1. Specifically, the learning table 127-1 learns the correspondence between the source address of a frame inputted into the L2 switch 100 and the input port of the frame as the correspondence between a destination address and an output port. Also, a flag is stored in the learning table 127-1 as identification information indicating whether the frame is a frame that will be transmitted between the subnets.

Figure 4:
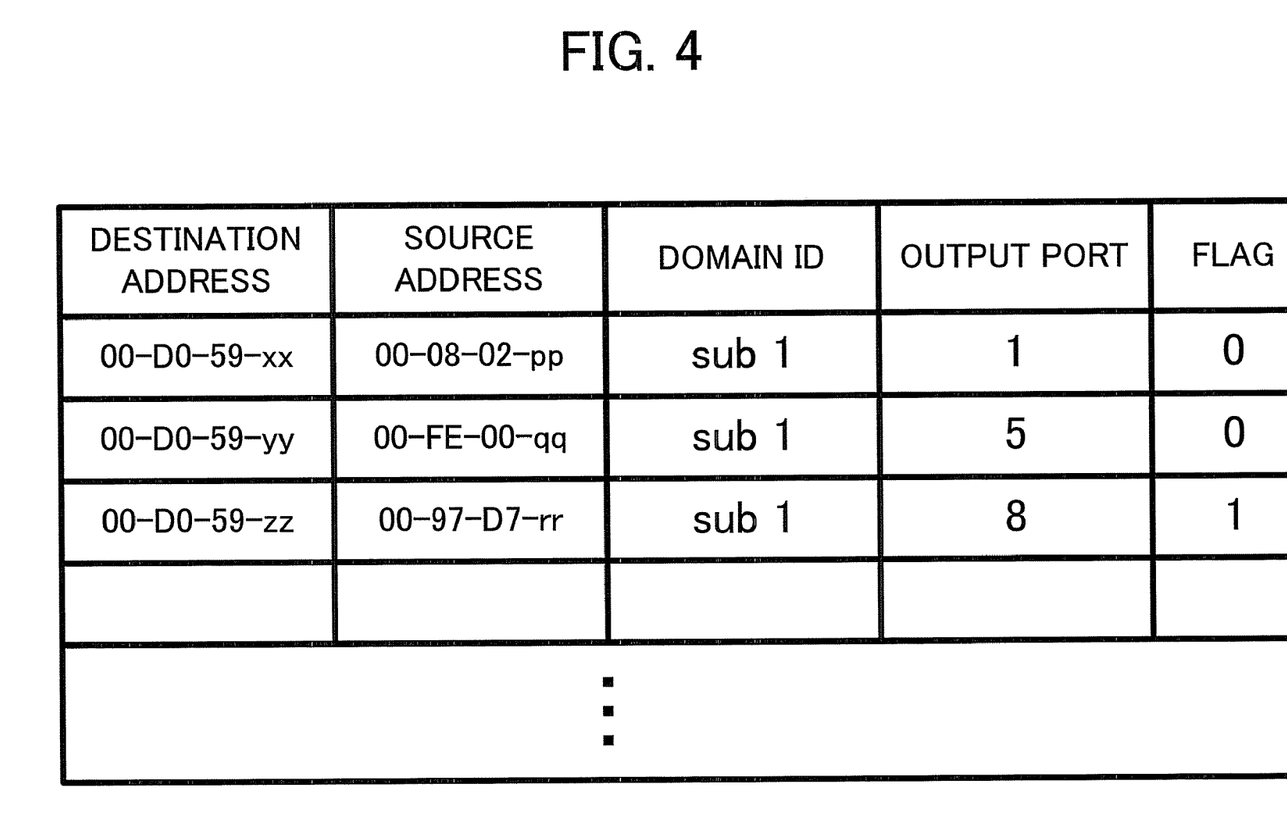
FIG. 4 is a diagram showing an example of a learning table according to the embodiment.

For example, as shown in FIG. 4, the learning table 127-1 stores destination addresses, source addresses, domain IDs, output port numbers, and flags. The destination addresses in FIG. 4 indicate the source addresses of the frames already relayed by the L2 switch 100, and the source addresses in FIG. 4 indicate the destination addresses of the frames.

As the domain ID of a frame to be transferred within the subnet #1, "sub 1" that is a domain ID unique to the subnet #1 is stored, since the domain ID assigned by the domain ID assignment unit 121-1 corresponding to the subnet #1 is registered as it is. And, as the domain ID of a frame to be transferred from subnet #2 to the subnet #1, "sub 1" is stored, since the domain ID "sub 2" assigned by the domain ID assignment unit 121-2 corresponding to the subnet #2 is converted to domain ID "sub 1" by the ID conversion unit 125-1 and the obtained domain IDs is registered.

As the output port of a frame to be transferred within the subnet #1, the number of the input port of the frame included in the input/output port unit 110-1 is stored. On the other hand, as the output port of a frame to be transferred from the subnet #2 to the subnet #1, the number of the input port of the frame included in the input/output port unit 110-2 is stored. As a flag corresponding to a frame transferred within the subnet #1, "0" is stored; as a flag corresponding to a frame transferred between the subnets, "1" is stored.

The transfer unit 130-1 performs flooding on a frame received from the port table 123-1, while it outputs a frame received directly from the destination determination unit 122-1 to the domain processing unit 120-1 or 120-2 corresponding to a set output port. The transfer unit 130-1 includes a flooding processing unit 131 and a flag determination unit 132.

The flooding processing unit 131 performs a flooding process for using all flooding ports notified by the port table 123-1 as the output port of a frame outputted from the port table 123-1. In other words, if the flooding processing unit 131 receives, from the port table 123-1, a frame with respect to which the output port number corresponding to the destination address has not been stored in the learning table, the flooding processing unit 131 performs a flooding process so that this frame is transmitted from all ports other than the input port of the frame.

At that time, the flooding processing unit 131 creates frames to be transmitted from the flooding ports by making replica frames of the original frame and sets the output ports of the replica frames as flooding ports. Then, the flooding processing unit 131 refers to the correspondences between the flooding ports and domain IDs notified of by the port table 123-1. If the output port of a replica frame is a port connected to a subnet to which the source of the original frame belongs, the flooding processing unit 131 assigns a flag "0" to the replica frame. In contrast, if the output port is a port connected to a subnet different from a subnet to which the source of the original frame belongs, the flooding processing unit 131 assigns a flag "1" to the replica frame. In other words, the flooding processing unit 131 assigns a flag "0" to a replica frame to be transmitted within a subnet to which the source of the original frame belongs at the time of flooding, while the flooding processing unit 131 assigns a flag "1" to a replica frame to be transmitted between the subnets at the time of flooding.

The flag determination unit 132 determines whether a frame is assigned a flag "0" or a flag "1." If the frame is assigned a flag "0," the flag determination unit 132 outputs the frame to the source registration unit 126-1 of the domain processing unit 120-1. In contrast, if the frame is assigned a flag "1," the flag determination unit 132 outputs the frame to the band control unit 124-2 of the domain processing unit 120-2. Specifically, if the flag determination unit 132 receives, from the destination determination unit 122-1, a frame with respect to which the output port number corresponding to the destination address has been already stored in the learning table, it refers to a flag assigned by the destination determination unit 122-1 to the frame. If the assigned flag is "0," the flag determination unit 132 outputs the frame to the source registration unit 126-1. In contrast, if the assigned flag is "1," the flag determination unit 132 outputs the frame to the band control unit 124-2 of the domain processing unit 120-2. On the other hand, if the flag determination unit 132 receives replicas of a frame with respect to which the output port number corresponding to the destination address has not been stored yet in the learning table, from the flooding processing unit 131, the flag determination unit 132 outputs ones including a flag "0" among the replica frames to the source registration unit 126-1 and outputs ones including a flag "1" thereamong to the band control unit 124-2 of the domain processing unit 120-2.

Figure 5:
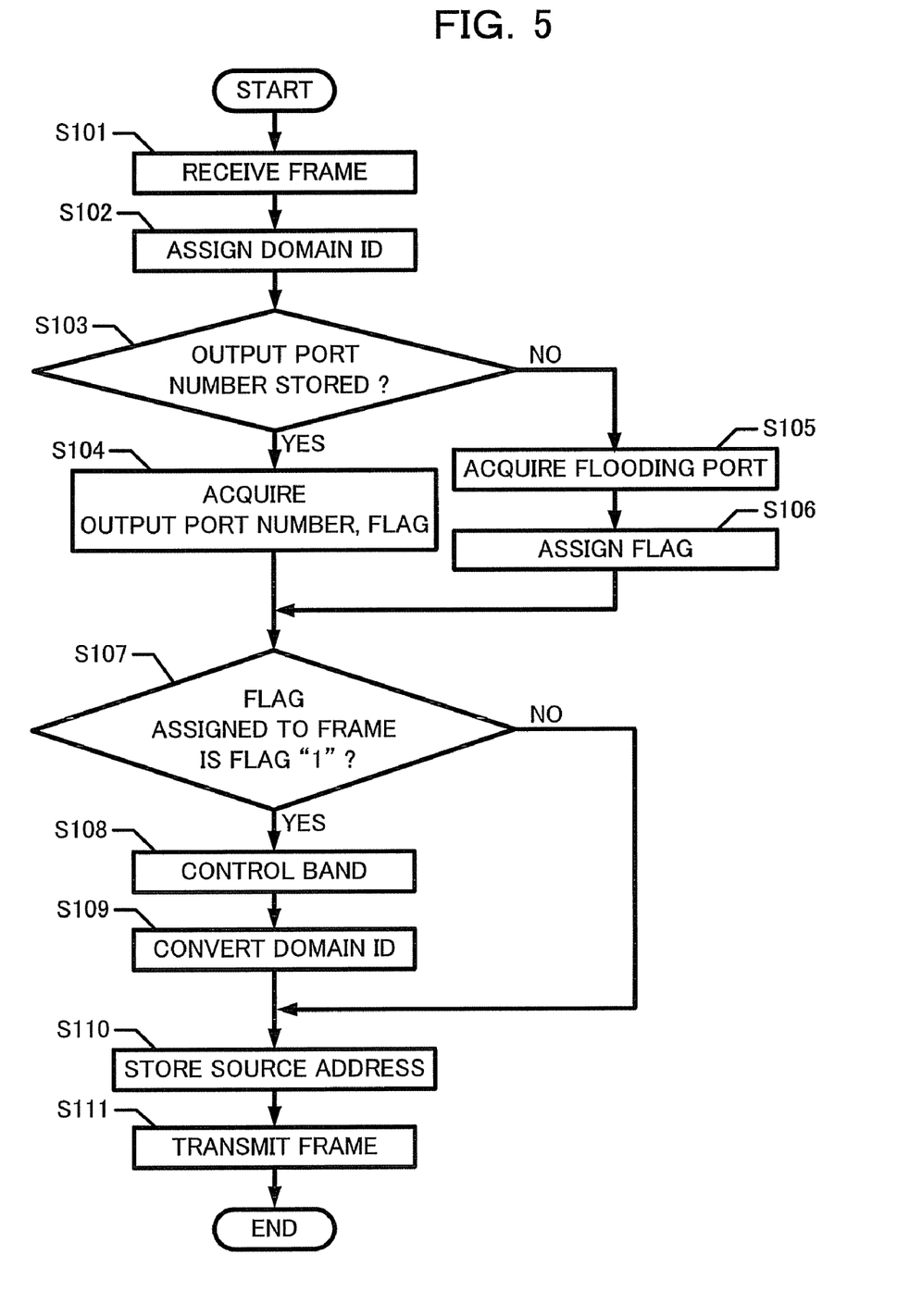
FIG. 5 is a flowchart showing operations of the L2 switch according to the embodiment.

Next, operations of the L2 switch 100 configured as mentioned above will be described with reference to a flowchart shown in FIG. 5. Specifically, operations performed when the L2 switch 100 receives a frame transmitted from the subnet #1 will be described in detail. Similar operations will be performed when the L2 switch 100 receives a frame transmitted from the subnet #2.

First, the L2 switch 100 receives a frame transmitted from the subnet #1 via any one of the ports included in the input/output port unit 110-1 (step S101). Then, the domain ID assignment unit 121-1 assigns, to the frame, a domain ID (e.g., "sub 1") unique to the subnet #1 (step S102). Then, the destination determination unit 122-1 determines whether an output port number corresponding to a destination address included in the frame and the domain ID assigned to the frame has been already stored in the learning table 127-1 (step S103).

If it is determined that the output port number has been already stored therein (YES in step S103), the destination determination unit 122-1 acquires the output port number corresponding to the destination address and domain ID, and the associated flag from the learning table 127-1 (step S104), and then assigns the flag to the frame. Then, the destination determination unit 122-1 sets the output port obtained from the learning table 127-1 as the output port of the frame, and outputs the frame to the flag determination unit 132 of the transfer unit 130-1.

As is understood from the above description, the frame whose output port number has been already stored therein is assigned a flag; therefore, it is determined whether the frame is to be transferred between the subnets. Specifically, if the frame is assigned a flag "0," the frame will be transferred within the subnet #1; if the frame is assigned a flag "1," the frame will be transferred from the subnet #1 to the subnet #2. This is because with regard to a frame transferred within the subnet #1, a flag "0" as well as the correspondence between the destination address of the frame and output port number thereof has been already stored in the learning table 127-1; with regard to a frame transferred between the subnets, a flag "1" as well as the correspondence between the destination address of the frame and output port number thereof has been already stored in the learning table 127-1.

In contrast, if an output port corresponding to the destination address and domain ID has not been stored yet in the learning table 127-1 (NO in step S103), the frame is outputted to the flooding processing unit 131 of the transfer unit 130-1 via the port table 123-1. At the same time, the port table 123-1 notifies the flooding processing unit 131 of all ports (flooding ports) other than the input port of the frame and domain IDs corresponding to the flooding ports. (step S105).

Then, the flooding processing unit 131 makes replicas of the frame and sets the output ports of the replica frames as flooding ports. Also, if the output port of a replica frame is a port of the input/output port unit 110-1 corresponding to the subnet #1, the flooding processing unit 131 assigns a flag "0" to the replica frame; if the output port of a replica frame is a port of the input/output port unit 110-2 corresponding to the subnet #2, the flooding processing unit 131 assigns a flag "1" to the replica frame (step S106). The replica frames for which output ports and flags have been set in the above-mentioned way are outputted to the flag determination unit 132.

As is understood from the above description, the replica frames of a frame whose output port number has not been stored yet in the learning table are assigned flags; therefore, it is determined whether each of the replica frames is a replica frame to be transferred between the subnets. Specifically, if a replica frame is assigned a flag "0," the replica frame will be transmitted into the subnet #1; if a replica frame is assigned a flag "1," the replica frame will be transmitted from the subnet #1 to the subnet #2. While a frame and a replica frame have different output ports and flags, they have the same type of information such as the destination address and source address. Therefore, a frame and a replica frame will be both referred to as a "frame" without distinguishing them from each other.

Upon receipt of a frame from the destination determination unit 122-1 or the flooding processing unit 131, the flag determination unit 132 determines whether a flag assigned to the frame is a flag "1" (step S107). In other words, the flag determination unit 132 determines whether the frame is to be transferred between the subnets.

If it is determined that the frame includes a flag "1" (YES in step S107), the flag determination unit 132 outputs the frame to the band control unit 124-2 of the domain processing unit 120-2. Then, the band control unit 124-2 controls the band of the frame so that the band of the frame becomes a band suitable for the subnet #2 (step S108). Also, the ID conversion unit 125-2 converts a domain ID (e.g., "sub 1") assigned to the frame into a domain ID (e.g., "sub 2") unique to the subnet #2 (step S109).

Then, the source registration unit 126-2 registers the correspondence between the source address of the frame and input port thereof as the correspondence between a destination address and an output port in the learning table 127-2 (step S110). Also, the source registration unit 126-2 stores the domain ID and flag assigned to the frame in the learning table 127-2. Specifically, the domain ID (e.g., "sub 2") unique to the subnet #2 and the flag "1" are stored in the learning table 127-2, since the domain ID has been already converted.

As described above, when the correspondence between the destination address of a frame and the output port thereof is stored in the learning table 127-2, the flag assigned to the frame is also stored therein. This means that information whether the frame is to be transferred between the subnets when the frame is relayed to the destination address is also stored. That is, if a flag "1" is stored as described above, the frame will be transferred between the subnets when the frame is relayed to the simultaneously learned destination address. This means that since the learned destination address is identical to the source address of the frame transmitted from the subnet #1, the frame to be transferred from the subnet #2 to this destination address will be transferred between the subnets.

After the source registration unit 126-2 registers the source address of the frame and the like in the learning table 127-2, the frame is transmitted from an output port set for the frame among the ports included in the input/output port unit 110-2 (step S111). In this case, if the output port number corresponding to the destination address of the frame has been stored in the learning table, the frame is received by a desired communication terminal, since a communication terminal corresponding to the destination address is connected to the output port of the frame. In contrast, if the output port number corresponding to the destination address of the frame has not been stored in the learning table, a communication terminal corresponding to the destination address is not always connected to the output port of the frame. However, if the communication terminal corresponding to the destination address is connected to the output port of the frame and if a response frame indicating that the frame has been received correctly is relayed by the L2 switch 100 again, the correspondence between the address and the port is newly learned. On the other hand, if the communication terminal corresponding to the destination address is not connected to the output port of the frame, there is no response. Therefore, the correspondence between the erroneous address and the port is not learned.

On the other hand, if the flag determination unit 132 determines that the frame includes a flag "0" (NO in step S107), it outputs the frame to the source registration unit 126-1 of the domain processing unit 120-1. Then, the source registration unit 126-1 stores the correspondence between the source address of the frame and the input port thereof as the correspondence between a destination address and an output port in the learning table 127-1 (step S110). At that time, the source registration unit 126-1 also stores the domain ID and flag assigned to the frame in the learning table 127-1. In this case, the domain ID assigned by the domain ID assignment unit 121-1 to the frame remains intact; therefore, the domain ID (e.g., "sub 1") unique to the subnet #1 and the flag "0" are stored in the learning table 127-1.

As is understood from the above description, when the correspondence between the destination address and output port is stored in the learning table 127-1, the flag assigned to the frame is also stored therein. This means that information whether the frame is to be transferred between the subnets when the frame is relayed to the destination address is also stored therein. That is, if a flag "0" is stored as described above, the frame will not be transferred between the subnets when the frame is relayed to the learned destination address. This is because the learned destination address is identical to the source address of the frame transmitted from the subnet #1 and therefore the frame to be transferred from the subnet #1 to this destination address will not be transferred between the subnets.

After the source address of the frame and the like are stored in the learning table 127-1 by the source registration unit 126-1, the frame is transmitted from a port set for the frame among the ports included in the input/output port unit 110-1 (step S111).

As described above, when a frame is relayed and flooding is performed, the frame is assigned a flag indicating whether the frame will be transferred between the subnets, and the flag as well as a destination address and an output port number corresponding to the destination address is stored in the learning table 127-1 or 127-2. Therefore, if the output port corresponding to the destination address of the frame has been already stored in either table, whether the frame will be transferred between the subnets is easily determined by referring to the flag stored in the learning table 127-1 or 127-2. For example, if different fee charging systems are applied to intra-subnet communications and inter-subnet communications, whether the transmission of a frame is an intra-subnet transmission or an inter-subnet transmission is determined by referring to a flag obtained from the learning table 127-1 or 127-2 and then assigned to the frame.

Also, in this embodiment, the subnet #1 and subnet #2 are connected to each other via only the L2 switch 100. Thus, only one L2 switch is enough to connect the two subnets to each other and all ports of the L2 switch are available for connection to communication terminals belonging to these subnets. As a result, an increase in cost required to form a network is prevented.

Also, in this embodiment, a flag indicating whether a frame will be transferred between the subnets as well as the correspondence between the destination address and output port is stored in the learning table. Therefore, when another frame is subsequently relayed to the destination address already stored in the learning table, it is easily determined whether the other frame will be transferred between the subnets. In other words, whether a frame will be relayed between the subnets is determined in one L2 switch. As a result, whether the transmission of a frame is an intra-subnet transmission and an inter-subnet transmission is determined while preventing an increase in cost required to configure a network.

In the above-mentioned embodiment, each time a frame is relayed, the source registration units 126-1 or 126-2 causes the learning table 127-1 or 127-2 to learn the source address and input port of the frame. However, if the source address of a frame has been already stored as a destination address in the learning table 127-1 or 127-2, the source address and input port of this frame need not be stored therein again. Nonetheless, the learning tables 127-1 and 127-2 always remain updated by performing learning each time a frame is relayed.

In the above-mentioned embodiment, the learning tables 127-1 and 127-2 are provided in the domain processing units 120-1 and 120-2, respectively. However, these two tables may be combined and used as one learning table. Even if the learning tables are combined, whether an output port to be referred to has been already learned is determined using a domain ID. Specifically, with regard to a frame transmitted from the subnet #1, it is sufficient to retrieve an output port that is stored in such a manner that the output port is associated with a domain ID corresponding to the subnet #1. With regard to a frame transmitted from the subnet #2, it is sufficient to retrieve an output port that is stored in such a manner that the output port is associated with a domain ID corresponding to the subnet #2. As such, the port tables 123-1 and 123-2 may be combined and used as one port table.

In the above-mentioned embodiment, a method for learning a route of a frame in the L2 switch 100 has been described. However, by writing this route learning method as a computer-readable path learning program and causing a computer to execute the route learning program, an advantage similar to that of the above-mentioned embodiment may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A frame relay apparatus comprising:
an acquisition unit to acquire a frame from any one of a plurality of input ports connected with a first subnet and a second subnet;
a setting unit to set an output port corresponding to a destination of the frame acquired by the acquisition unit;
an assignment unit to assign, to the frame, a flag indicating whether the frame is used for one of an intra-subnet communication where the frame is transferred within the first subnet or the second subnet, and an inter-subnet communication where the frame is transferred between the first subnet and the second subnet, different fee systems being applied to the intra-subnet communication and the inter-subnet communication;
a registration unit to store data of the flag assigned to the frame as well as a source address and a port number of the frame acquired by the acquisition unit in a learning table storing a correspondence between an address and a port number;
a first transmission unit to transmit the frame to the first subnet via the output port in the case where the output port of the frame set by the setting unit is connected to the first subnet; and
a second transmission unit to transmit the frame to the second subnet via the output port in the case where the output port of the frame set by the setting unit is connected to the second subnet.

2. The frame relay apparatus according to claim 1,
wherein the setting unit sets a port number corresponding to the destination address of the frame in the learning table as an output port of the frame, in the case where the destination address of the frame has been already stored in the learning table.

3. The frame relay apparatus according to claim 2,
wherein the assignment unit assigns, to the frame, the flag that is stored in the learning table, the flag corresponding to the output port set by the setting unit.

4. The frame relay apparatus according to claim 1,
wherein the setting unit sets all ports other than the input port of the frame as output ports of the frame in the case where, the destination address of the frame has not been stored yet in the learning table.

5. The frame relay apparatus according to claim 4,
wherein the assignment unit copies the frame in accordance with the number of the output ports set by the setting unit, and assigns the flag indicating that an output port of a first copied frame is connected to the first subnet, to the first copied frame for which an output port corresponding to the first subnet is set, and assigns the flag indicating that an output port of a second copied frame is connected to the second subnet, to the second copied frame for which an output port corresponding to the second subnet is set.

6. The frame relay apparatus according to claim 1, further comprising:
a band controller to control a band of the frame so as to have quality of service with a level corresponding to the second subnet, in the case where the flag assigned to the frame by the assignment unit indicates that the output of the frame is connected to the second subnet; and
an output unit to transmit the frame band-controlled by the band control unit from the output port.

7. A route learning method of a relay apparatus comprising:
acquiring a frame from an input port connected to a first subnet;
setting an output port corresponding to a destination of the frame acquired in said acquiring;
assigning, to the frame, a flag indicating whether the frame is used for one of an intra-subnet communication where the frame is transferred within the first subnet and an inter-subnet communication that the frame is transferred between the first subnet and a second subnet, different free systems being applied to the intra-subnet communication and the inter-subnet communication; and
storing data of the flag assigned to the frame in said assigning as well as a source address and a port number of the frame acquired in said acquiring in a learning table storing a correspondence between an address and a port number.

* * * * *

UNITED STATES PATENT AND TRADEMARK OFFICE
CERTIFICATE OF CORRECTION

| | |
|---|---|
| PATENT NO. | : 8,064,456 B2 |
| APPLICATION NO. | : 12/364564 |
| DATED | : November 22, 2011 |
| INVENTOR(S) | : Mami Sekido |

It is certified that error appears in the above-identified patent and that said Letters Patent is hereby corrected as shown below:

Column 12, Line 11, In Claim 7, delete "free systems" and insert -- fee systems --, therefor.

Signed and Sealed this

Thirty-first Day of January, 2012

David J. Kappos
*Director of the United States Patent and Trademark Office*